United States Patent
Hovis et al.

(10) Patent No.: US 8,459,567 B2
(45) Date of Patent: Jun. 11, 2013

(54) NON-LINEAR STRAIN GAGE INCORPORATING A NESTED BINARY CODE SYMBOL

(71) Applicant: Direct Measurements, Inc., Atlanta, GA (US)

(72) Inventors: Gregory Hovis, Martinez, GA (US); William Ranson, Columbia, SC (US); Reginald Vachon, Atlanta, GA (US)

(73) Assignee: Direct Measurements, Inc., Atlanta, GA (US)

(*) Notice: Subject to any disclaimer, the term of this patent is extended or adjusted under 35 U.S.C. 154(b) by 0 days.

(21) Appl. No.: 13/692,406

(22) Filed: Dec. 3, 2012

(65) Prior Publication Data

US 2013/0094013 A1   Apr. 18, 2013

Related U.S. Application Data

(62) Division of application No. 12/311,055, filed as application No. PCT/US2007/018184 on Aug. 16, 2007, now Pat. No. 8,322,627.

(60) Provisional application No. 60/838,151, filed on Aug. 17, 2006, provisional application No. 60/838,152, filed on Aug. 17, 2006, provisional application No. 60/838,153, filed on Aug. 17, 2006, provisional application No. 60/838,155, filed on Aug. 17, 2006, provisional application No. 60/838,201, filed on Aug. 17, 2006.

(51) Int. Cl.
*G06K 19/06* (2006.01)

(52) U.S. Cl.
USPC ..................... 235/494; 235/462.01

(58) Field of Classification Search
USPC ..................... 235/494, 455, 432, 487, 462.01
See application file for complete search history.

(56) References Cited

U.S. PATENT DOCUMENTS

| | | | |
|---|---|---|---|
| 4,874,936 A * | 10/1989 | Chandler et al. | 235/494 |
| 4,896,029 A | 1/1990 | Chandler et al. | |
| 5,612,524 A | 3/1997 | Sant'Anselmo et al. | |
| 5,726,435 A | 3/1998 | Hara et al. | |
| 5,777,309 A | 7/1998 | Maltsev et al. | |
| 5,811,776 A | 9/1998 | Liu | |
| 5,862,267 A | 1/1999 | Liu | |
| 6,267,296 B1 | 7/2001 | Ooshima et al. | |
| 6,601,772 B1 * | 8/2003 | Rubin et al. | 235/494 |
| 6,802,450 B2 | 10/2004 | Cheung et al. | |
| 6,830,197 B2 * | 12/2004 | Rubin et al. | 235/494 |
| 6,866,199 B1 | 3/2005 | Keech et al. | |

(Continued)

FOREIGN PATENT DOCUMENTS

WO   2005/125020 A1   12/2005

*Primary Examiner* — Thien M Le
(74) *Attorney, Agent, or Firm* — Jacobson Holman PLLC

(57) ABSTRACT

A non-linear strain gage includes a target for association with an object for which at least one of strain and fatigue damage is to be measured, a sensor, and a computer. The target incorporates a nested binary code symbol for perimeter-based deformation and strain analysis and emits a detectable physical quantity. The binary code symbol includes a boundary binary code symbol having a perimeter constructed of line segments and at least a core code symbol that provides encoded data. The core code symbol is nested within and concentric with the boundary binary code symbol. A method of measuring strain on an object directly using the non-linear strain gage is also provided.

8 Claims, 8 Drawing Sheets

U.S. PATENT DOCUMENTS

| | | |
|---|---|---|
| 6,874,370 B1 | 4/2005 | Vachon |
| 6,934,013 B2 | 8/2005 | Vachon et al. |
| 7,388,689 B2 | 6/2008 | Lapstun et al. |
| 7,477,995 B2 | 1/2009 | Hovis et al. |
| 7,533,818 B2 * | 5/2009 | Hovis et al. .............. 235/462.09 |
| 7,621,459 B2 | 11/2009 | Hovis |
| 7,878,415 B2 | 2/2011 | Hovis |
| 8,191,784 B2 * | 6/2012 | Hovis et al. .............. 235/462.09 |
| 2004/0036853 A1 | 2/2004 | Vachon et al. |
| 2006/0173638 A1 | 8/2006 | Hovis et al. |
| 2009/0326836 A1 | 12/2009 | Hovis et al. |
| 2010/0072288 A1 | 3/2010 | Hovis et al. |
| 2012/0185182 A1 | 7/2012 | Hovis et al. |

* cited by examiner

NON-LINEAR STRAIN GAGE INCORPORATING A NESTED BINARY CODE SYMBOL

CROSS-REFERENCE TO RELATED APPLICATIONS

The present patent application a divisional of U.S. application Ser. No. 12/311,055, filed Aug. 26, 2009, which is a nationalization of International application No. PCT/US2007/018184, filed Aug. 16, 2007, published in English, which is based on, and claims priority from, U.S. provisional Application Nos. 60/838,151, 60/838,152, 60/838,153, 60/838,155, and 60/838,201, all filed Aug. 17, 2006, all of which are incorporated herein by reference in their entireties.

BACKGROUND OF THE INVENTION

1. Field of the Invention

The present invention relates to a binary code symbol for non-linear strain measurement. More specifically, the invention relates to a binary code symbol for non-linear strain measurement that constitutes an improvement over the binary code symbol that is the subject of co-pending U.S. Published Application No. 2006-0289652-A1 (application Ser. No. 11/167,558, filed Jun. 28, 2005).

2. Related Art

Co-pending U.S. Published Application No. 2006-0289652-A1, the disclosure of which is incorporated herein by reference in its entirety, is directed to a rectangular binary code symbol for non-linear strain measurement comprising a solid, continuous perimeter, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background. Each data region comprises a number of data cells, each data cell representing a single bit of binary data; and each utility region comprises a number of utility cells of alternating appearance.

The binary code symbol disclosed in U.S. Published Application No. 2006-0289652-A1 has a number of advantages, including that it has a unique geometry and attributes; it provides a binary code symbol for non-linear strain measurement having features that enhance deformation and strain measurement; it provides a binary code symbol for non-linear strain measurement that is designed specifically for perimeter-based deformation and strain analysis; it provides a perimeter strain analysis method for use with a binary code symbol for non-linear strain measurement; it provides a binary code symbol for non-linear strain measurement with near-perimeter data encoding; and it provides a binary code symbol for non-linear strain measurement that can encode a range of data values using an error-correcting code ("ECC") technique.

However, the amount of data that can be encoded into the binary code symbol is limited by the space available in the perimeter of the binary code symbol.

It is to the solution of this and other problems that the present invention is directed.

SUMMARY OF THE INVENTION

It is accordingly a primary object of the present invention to provide a binary code symbol that provides additional data, such as data that can be termed a "license plate" (because the encoded data can be used to identify a symbol being used to measure strain, much as a license plate can be used to identify a vehicle), and/or strain readings, over successive areas of its surface.

It is another object of the present invention to provide a binary code symbol for non-linear strain measurement having a unique geometry and attributes.

It is still another object of the present invention to provide a binary code symbol for non-linear strain measurement having features that enhance deformation and strain measurement.

It is still another object of the present invention to provide a binary code symbol for non-linear strain measurement that is designed specifically for perimeter-based deformation and strain analysis.

It is still another object of the present invention to provide a perimeter strain analysis method for use with a binary code symbol that provides additional data over successive areas of its surface It is still another object of the present invention to provide a binary code symbol for non-linear strain measurement with near-perimeter data encoding.

It is another object of the present invention to provide a binary code symbol for non-linear strain measurement that can encode a range of data values using an error-correcting code ("ECC") technique.

These and other objects of the invention are achieved by the provision of a nested binary code symbol comprising a boundary binary code symbol and at least a core code symbol that provides encoded data, wherein the core code symbol is nested within and concentric with the boundary binary code symbol. The core code symbol need not be either rectangular or a binary code symbol. The boundary binary code symbol is a rectangular binary code symbol of the type disclosed in U.S. Published Application No. 2006-0289652-A1, or a binary code symbol of the type disclosed in our copending provisional application No. 60/838,152, filed Aug. 17, 2006 entitled "Multi-Format Binary Code Symbol For Non-Linear Strain Measurement," or a binary code symbol of the type disclosed in our copending provisional application No. 60/838,151, filed Aug. 17, 2006 entitled "High Density, Rectangular Binary Code Symbol," all of which are incorporated herein by reference in their entireties.

If the boundary binary code symbol is a rectangular binary code symbol of the type disclosed in U.S. Published Application No. 2006-0289652-A1 or the type disclosed in provisional application No. 60/838,151 entitled "High Density, Rectangular Binary Code Symbol," the boundary binary code symbol has a solid, continuous perimeter, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background; wherein each data region comprises a number of data cells, each data cell representing a single bit of binary data; and each utility region comprises a number of utility cells of alternating appearance.

If the boundary binary code symbol is a rectangular binary code symbol of the type disclosed in provisional application No. 60/838,152 entitled "Multi-Format Binary Code Symbol For Non-Linear Strain Measurement," then the boundary binary code symbol can be constructed in any geometric shape having a perimeter constructed of line segments, an optional inner perimeter, which is constructed of line segments, one or more finder cells to "orient" the symbol and encoded data in "data regions" and/or "utility regions," the data "density" of which can be varied depending upon the application, by varying the number of distinct data or utility cells present in the data regions or utility regions The data and utility regions can be distinct and separate, combined, exclusive (i.e. data regions and no utility regions, or utility regions and no data regions), or omitted.

In one aspect of the invention, the nested binary code symbol also includes at least one intermediate binary code symbol concentric with and nested between the boundary binary code symbol and the core code symbol.

In another aspect of the invention, all of the binary code symbols and the core code symbol all can comprise a binary code symbol of the type disclosed in one of U.S. Published Application No. 2006-0289652-A1, provisional application No. 60/838,152, or provisional application No. 60/838,151 entitled "High Density, Rectangular Binary Code Symbol."

In an alternate aspect of the invention, all but the core code symbol comprise a binary code symbol of the type disclosed in one of U.S. Published Application No. 2006-0289652-A1, provisional application No. 60/838,152, or provisional application No. 60/838,151, and the core code symbol comprises a different type of binary code symbol.

The different type of binary code symbol can be a conventional Data Matrix symbol, various modifications of a conventional Data Matrix symbol, such as the type disclosed in our co-pending provisional application No. 60/838,155, filed Aug. 17, 2006 entitled "Two Dimensional Bar Code," which is incorporated herein by reference in its entirety, or any symbology containing encoded data.

A non-linear strain gage in accordance with the present invention comprises a target associated with an object for which at least one of strain and fatigue damage is to be measured, sensor means for pre-processing a detectable physical quantity emitted by the target and output data representing the physical quantity, the sensor means being compatible with the detectable physical quantity, means for analyzing the data output by the sensor means to define the binary code symbol, and means for measuring the strain on the object directly based on the pre-processed and analyzed data, wherein the target comprises the nested binary code symbols in accordance with the present invention.

In another aspect of the invention, the non-linear strain gage further comprises means for utilizing the strain measurement to provide information on at least one of fatigue damage and strain hysteresis for materials of known and unknown mechanical properties.

In a method of measuring strain on an object directly, in accordance with the present invention, the nested binary code symbols are associated with an object in such a way that deformation of the nested binary code symbols and deformation under load of the object bear a one-to-one relationship, wherein the nested binary code symbols emit a detectable physical quantity. The changes in the nested binary code symbols are identified as a function of time and change in the load applied to the object. The changes in the nested binary code symbols are then translated into a direct measurement of strain.

The nested binary code symbol in accordance with the present invention is based on the same theories as described in U.S. Published Application No. 2006-0289652-A1

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
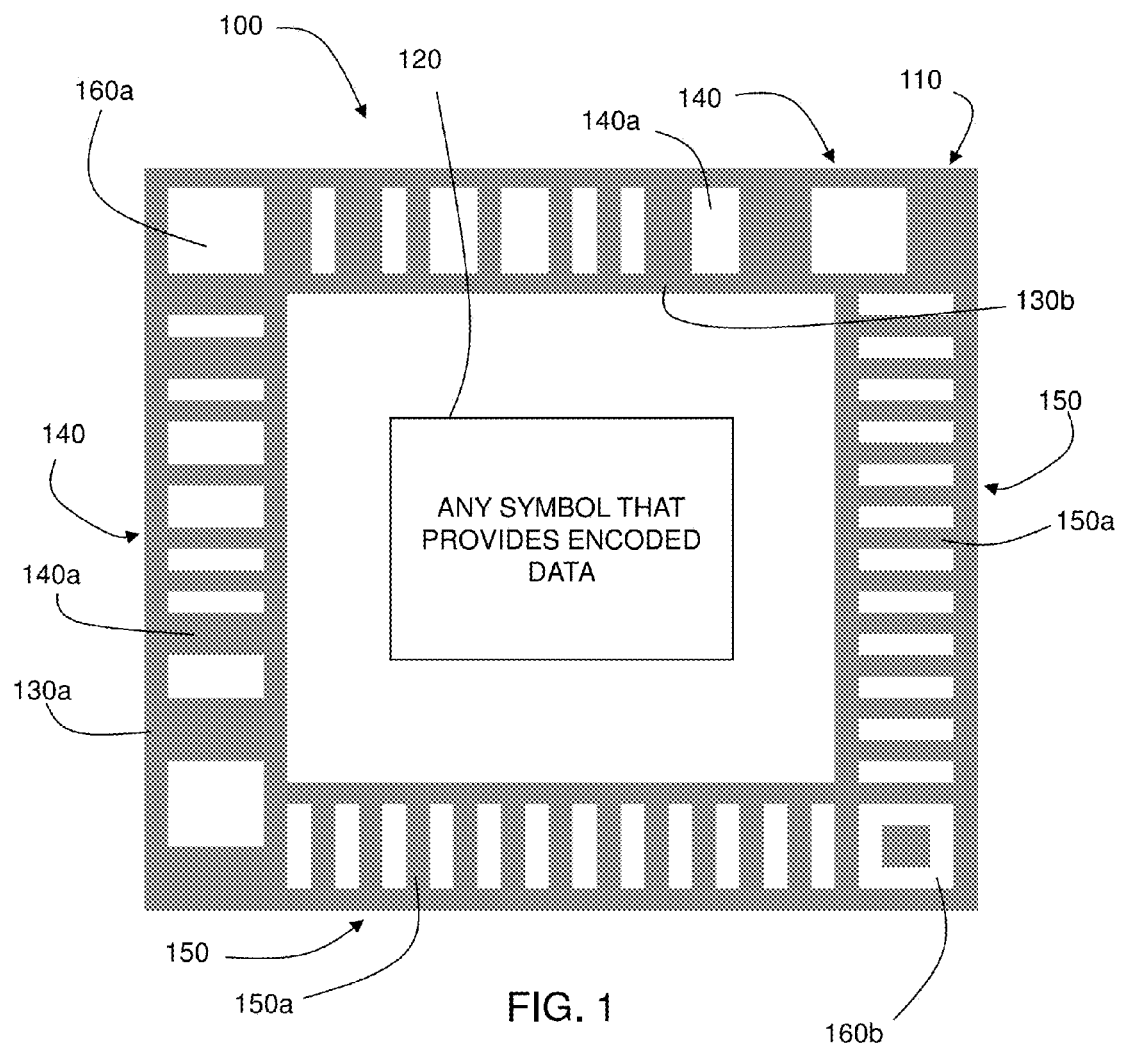
FIG. 1 is an illustration of two nested, rectangular binary code symbols in accordance with a first embodiment of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A nested binary code symbol for non-linear strain measurement in accordance with the present invention is designed specifically for perimeter-based deformation and strain analysis, while providing for robust, self-checking/self-correcting data encoding. Specific geometric features of the symbol are optimized for perimeter-based, non-linear strain measurement using discrete or analog deformation analysis methods.

The nested binary code symbol 100 comprises a boundary binary code symbol 110 and at least a core code symbol 120 that provides encoded data, wherein the core code symbol 120 is nested within and concentric with the boundary binary code symbol 110. The boundary binary code symbol 110 is a rectangular binary code symbol of the type disclosed in application Ser. No. 11/167, or a binary code symbol of the type disclosed in provisional application No. 60/838,152 or provisional application No. 60/838,151.

A rectangular binary code symbol of the type disclosed in U.S. Published Application No. 2006-0289652-A1 or the type disclosed in provisional application No. 60/838,151 is rectangular in shape, has a solid, continuous outer perimeter 130*a*, and enables data encoding near the symbol's outer perimeter 130*a*. Each rectangular binary code symbol also has a solid, continuous inner perimeter 130*b*, although in general, a solid, continuous inner perimeter 130*b* is not required. There are two data regions 140 along adjacent sides of the rectangle. Each data region 140 is made up of at least one row of data cells 140*a*; no particular limit is placed on the number of data cells 140*a* per row or the number of rows per data region 140. In the case of a rectangular binary code symbol that is symmetric about a diagonal of the rectangle, the data regions 140 can be mirror images of one another for encoded-data redundancy.

Opposite each data region 140 along a side of the rectangle is a utility region 150. Each utility region 150 is made up of at least one row of utility cells with alternating appearance (i.e. foreground, background, foreground, etc.) The utility regions 150 assist in symbol location, orientation, and analysis. In addition, as disclosed in U.S. Published Application No. 2006-0289652-A1, the inner half of the utility regions 150 can be used to store auxiliary information and/or codes (e.g. license plate number, vendor ID, application ID, function ID, version information, date/time, materials ID/info, etc.) The amount of data that can be stored in the utility regions 150 can be increased by staggering the cells 150a in the utility regions 150. In the case of a rectangular binary code symbol that is symmetric about a diagonal of the rectangle, the utility regions 150 can be mirror images of one another.

There are two distinct finder cells 160a and 160b on opposite corners of the rectangle, which can be used to orient the symbol. Inner and outer quiet regions 170a and 170b are designated, whereby the data regions 140, the utility regions 150, and the finder cells 160a and 160b can be distinguished from their background.

In a rectangular binary code symbol in accordance with U.S. Published Application No. 2006-0289652-A1, information is encoded via the symbol's data cells 140a. An individual data cell 140a represents a single bit of information; that is, its state is either "on" or "off" (i.e. "1" or "0"). The order and state of individual bit values combine to represent an encoded data value. The binary contribution of a single data cell 140a is indicated by the cell's state, which is determined by a sensor. Data cells 140a that have the same appearance as the symbol's background (or quiet region) are considered "on" or bit value "1." Data cells 140a that have the same appearance as the foreground (or perimeter) are considered "off" or bit value "0." There are no restrictions placed on cell foreground and background appearance except that sufficient contrast is provided to enable a sensor to determine cell state.

If the boundary binary code symbol 110 is a binary code symbol of the type disclosed in provisional application No. 60/838,152 entitled "Multi-Format Binary Code Symbol For Non-Linear Strain Measurement," then the boundary binary code symbol 110 can be constructed in any geometric shape having a perimeter constructed of line segments, an optional inner perimeter, which is constructed of line segments, one or more finder cells to "orient" the symbol and encoded data in data regions 140 and/or utility regions 150, the data "density" of which can be varied depending upon the application, by varying the number of distinct data or utility cells present in the data regions 140 or utility regions 150 The data regions 140 and utility regions 150 can be distinct and separate, combined, exclusive (i.e. data regions 140 and no utility regions 150, or utility regions 150 and no data regions 140), or omitted.

As disclosed in U.S. provisional application No. 60/838, 153, refinement of the marking process can be used to increase the density of the data. More specifically, the cells must have well defined (not fuzzy) edges, and as the imaging lens magnifies the image and the edges, the selection of the marking process affects the quality of the edges. If a short wave length laser is used for marking, as compared to a long wave laser, the definition and quality for the edge can be refined and smaller cells can be produced.

As shown in FIGS. 2-5, the nested binary code symbol in accordance with the present invention can also include at least one intermediate binary code symbol 180 concentric with and nested between the boundary binary code symbol 110 and the core code symbol. The boundary and intermediate binary code symbols 110 and 180 and the core code symbol 120 all can comprise one of the types of binary code symbols disclosed in U.S. Published Application No. 2006-0289652-A1, Application No. 60/838,151, or Application No. 60/838,152. Alternatively, the boundary and intermediate binary code symbols 110 and 180, but not the core code symbol 120, can comprise one of the types of binary code symbols of the type disclosed in U.S. Published Application No. 2006-0289652-A1, Application No. 60/838,151, or Application No. 60/838, 152; and the core code symbol can comprises a different type of code symbol, which may or may not be binary. The different type of code symbol can be a conventional Data Matrix symbol, various modifications of a conventional Data Matrix symbol, such as the type disclosed in Application No. 60/838, 155, or any symbology containing encoded data.

FIG. 1 is an illustration of a general example of a nested binary code symbol in accordance with the present invention, which comprises a boundary binary code symbol 110 and a core code symbol 120 that provides encoded data, wherein the core code symbol 120 is nested within and concentric with the boundary binary code symbol 110, and the core code symbol is any type of symbology containing encoded data. In the example of FIG. 1, the boundary binary code symbol 110 is of the type disclosed in U.S. Published Application No. 2006-0289652-A1. Although two nested symbols are shown in FIG. 1, it will be appreciated that one or more binary code symbols can be nested between the boundary binary code symbol 110 and the core boundary code symbol in accordance with the second embodiment of the invention.

Figure 2:
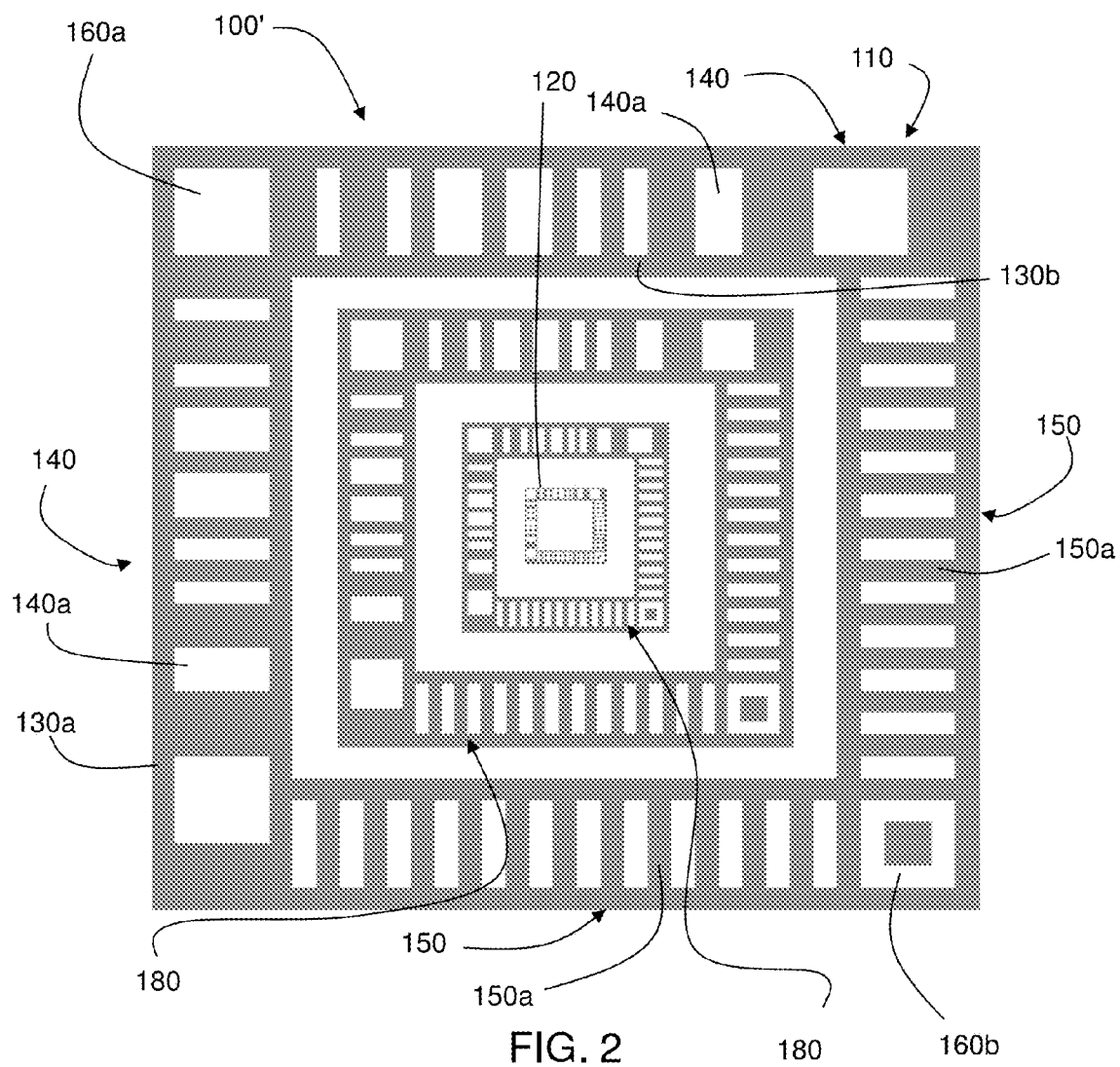
FIG. 2 shown an example of a first embodiment of the present invention.

FIG. 2 is an illustration of a nested, rectangular binary code symbol 100' in accordance with a first embodiment of the invention, in which the nested binary code symbol comprises a boundary binary code symbol 110 and a core code symbol 120 that provides encoded data, and further includes two intermediate binary code symbols 180 concentric with and nested between the boundary binary code symbol 110 and the core code symbol. Although four nested symbols are shown in FIG. 2, it will be appreciated that more than four symbols can be nested in accordance with the first embodiment of the invention.

In the embodiment shown in FIG. 2, all of the binary code symbols are of the type disclosed in U.S. Published Application No. 2006-0289652-A1.

Figure 3:
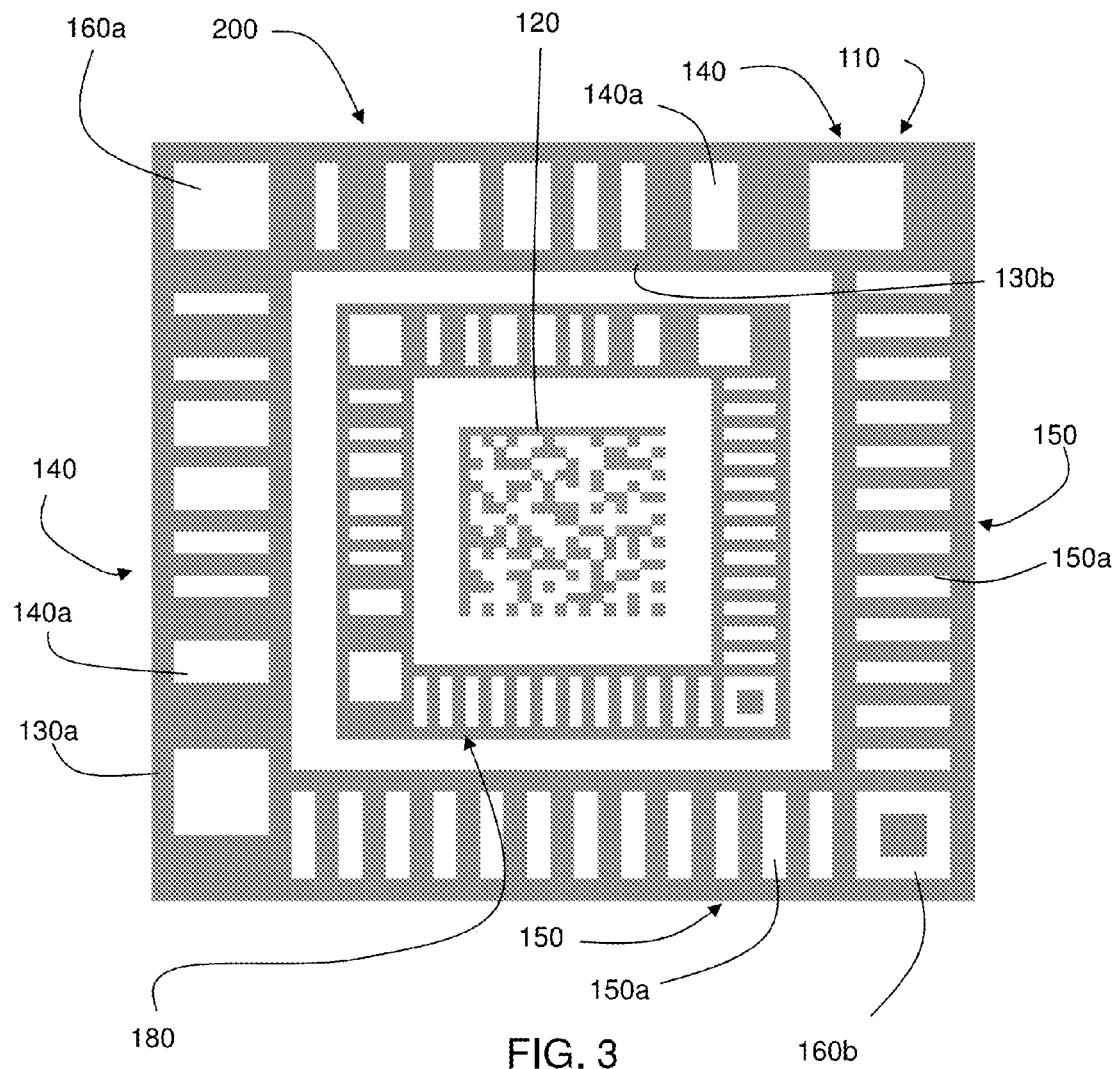
FIG. 3 shows a first example of a second embodiment of the present invention.

FIG. 3 shows a first example of a second embodiment of the present invention, in which the nested binary code symbol 200 comprises a boundary binary code symbol 110 and a core code symbol 120 that provides encoded data, and further includes one intermediate binary code symbol 180 concentric with and nested between the boundary binary code symbol 110 and the core code symbol. In this first example of the second embodiment, all but the core code symbol 120 comprises a binary code symbol of the type disclosed in U.S. Published Application No. 2006-0289652-A1, and the core code symbol 120 comprises a second, different type of binary code symbol. In the example of FIG. 3, the core code symbol 120 is a conventional Data Matrix symbol. Although one intermediate binary code symbol 180 is shown in FIG. 3, it will be appreciated that more than one intermediate binary code symbol 180 can be nested between the boundary binary code symbol 110 and the core code symbol 120 as in the first embodiment of the invention shown in FIG. 2.

Figure 4:
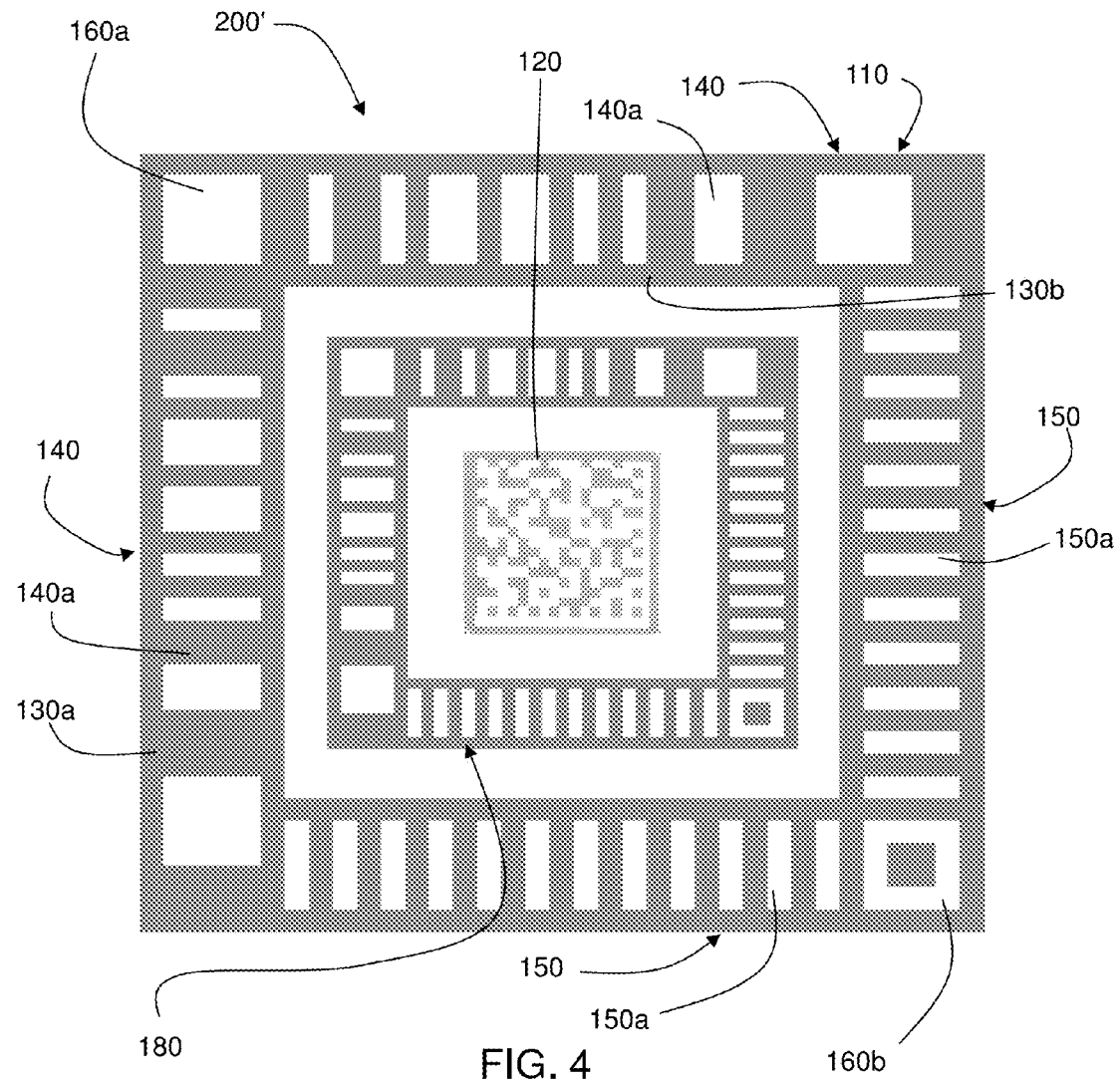
FIG. 4 shows a second example of the second embodiment of the present invention.

FIG. 4 shows a second example 200' of the second embodiment of the present invention, in which the core code symbol is a first type of modified Data Matrix Symbol as disclosed in our co-pending provisional U.S. patent application No. 60/838,155, the disclosure of which is incorporated herein by reference in its entirety. Although three nested symbols 110, 120, and 180 are shown in FIG. 4, it will be appreciated that more than one intermediate binary code symbol 180 can be nested between the boundary binary code symbol 110 and the core code symbol 120 in accordance with the second embodiment of the invention.

Figure 5:
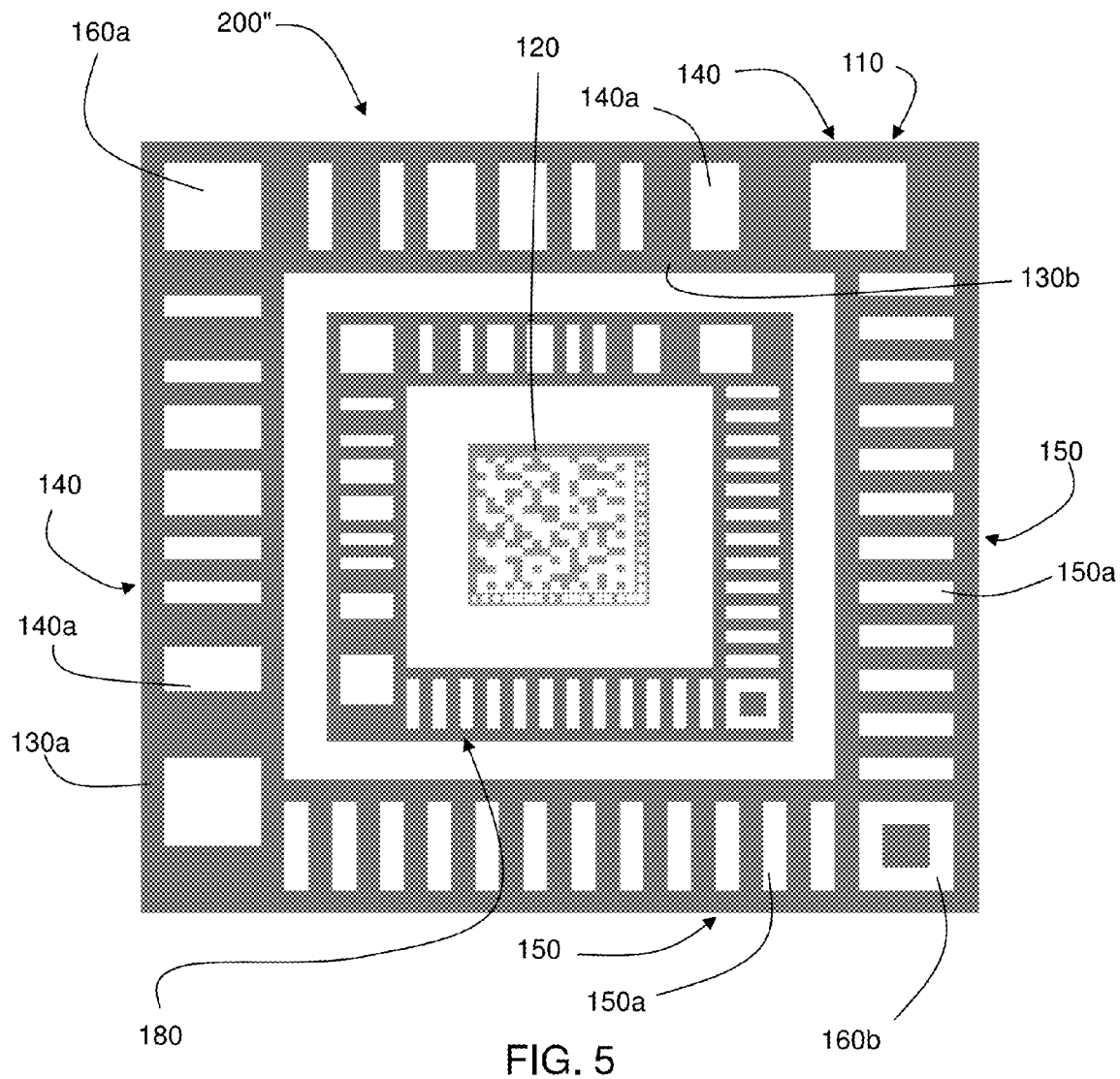
FIG. 5 shows a third example of the second embodiment of the present invention.

FIG. 5 shows a third example 200" of a second embodiment of the present invention, in which the core binary code symbol 120 is a second type of modified Data Matrix Symbol as disclosed in our co-pending provisional U.S. patent application No. 60/838,155. Although three nested symbols 110, 120, and 180 are shown in FIG. 5, it will be appreciated that more than one intermediate binary code symbol 180 can be nested between the boundary binary code symbol 110 and the core code symbol 120 in accordance with the second embodiment of the invention.

Figure 6:
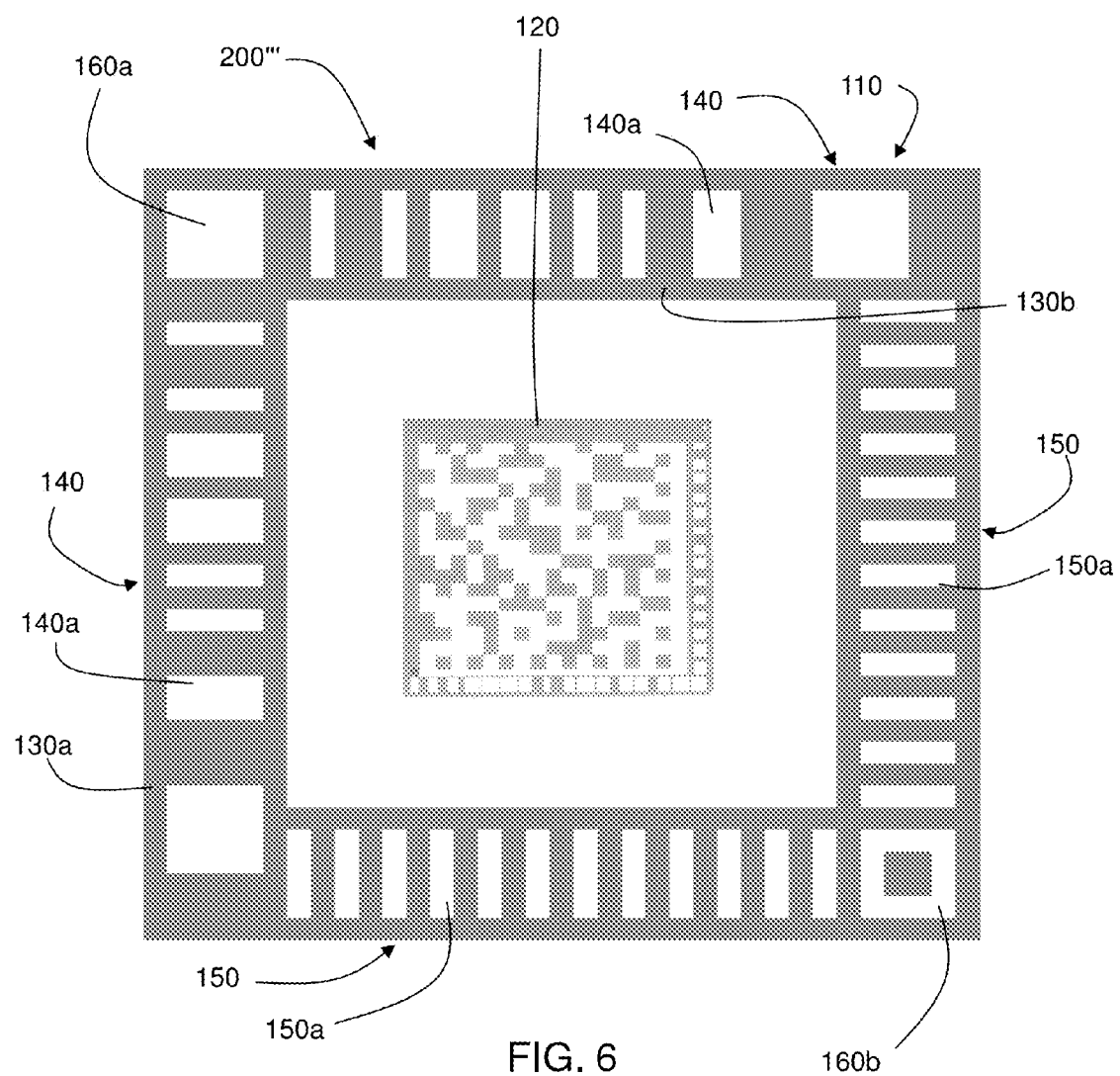
FIG. 6 shows a fourth example of the second embodiment of the present invention

FIG. 6 shows a fourth example 200''' of a second embodiment of the present invention, in which the core code symbol 120 is the same type of modified Data Matrix Symbol as in FIG. 4. Although two nested symbols 110 and 120 are shown in FIG. 6, it will be appreciated that at least one intermediate binary code symbol 180 can be nested between the boundary binary code symbol 110 and the core code symbol 120 in accordance with the second embodiment of the invention.

Figure 7:
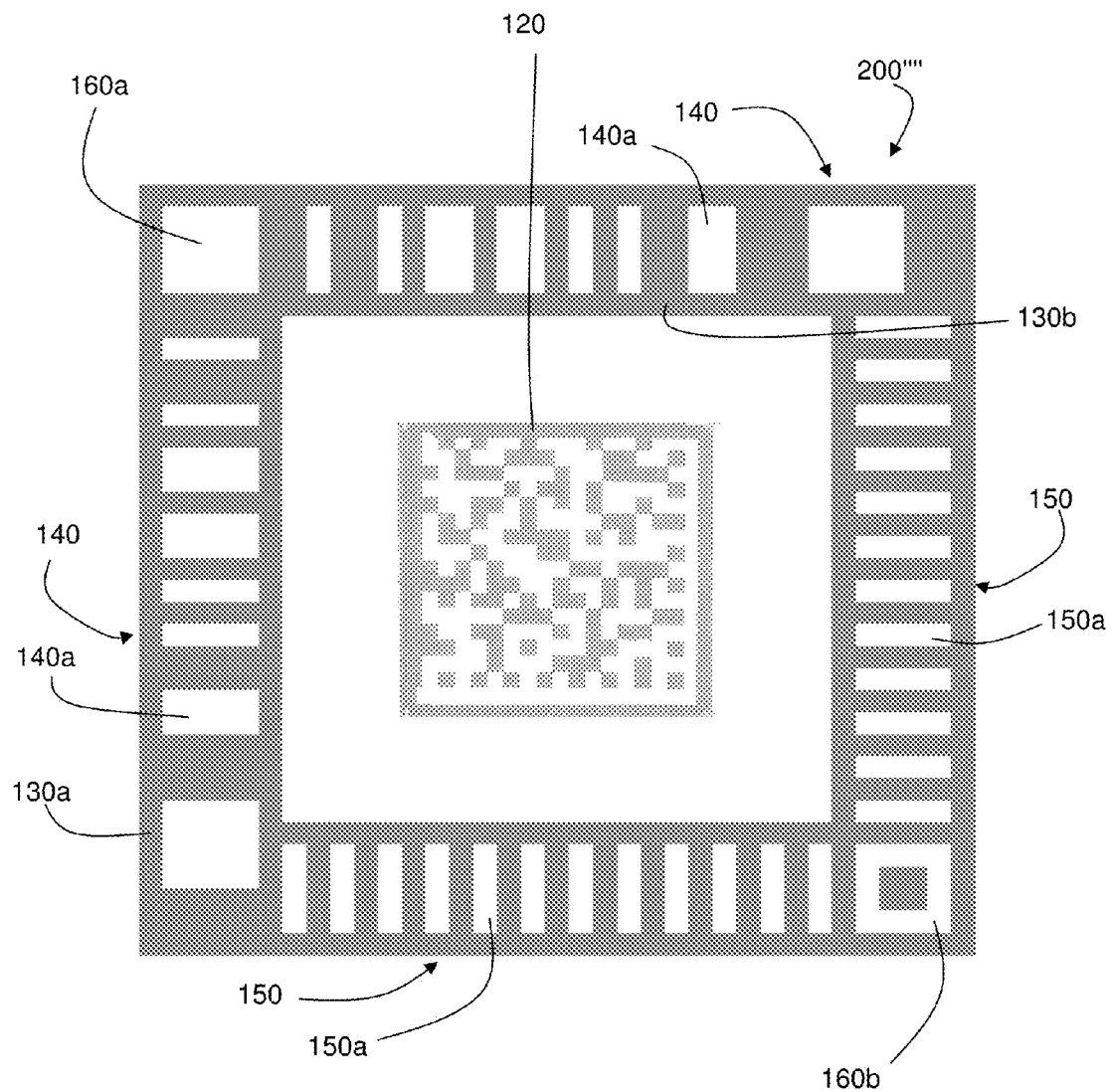
FIG. 7 shows a fifth example of the second embodiment of the present invention.

FIG. 7 shows a fifth example 200'''' of a second embodiment of the present invention, in which the core binary code symbol 120 is the same type of modified Data Matrix Symbol as in FIG. 3. Although two nested symbols 110 and 120 are shown in FIG. 7, it will be appreciated that at least one intermediate binary code symbol 180 can be nested between the boundary binary code symbol 110 and the core code symbol 120 in accordance with the second embodiment of the invention.

The nesting of the symbols as shown in FIGS. 1-7 provides additional license plate numbers and/or strain readings over successive areas of the surface.

In all of the above examples, the symbols are based on the same theory as described in the U.S. Patent U.S. Published Application No. 2006-0289652-A1. The nested binary code symbol in accordance with the present invention can be used as the target of a non-linear strain gage for measuring the strain on an object under load as described in U.S. Published Application No. 2006-0289652-A1. Such a non-linear strain gage is shown diagrammatically in FIG. 8, which except for the reference numbers, is the same as the non-linear strain gage shown in FIG. 5 of U.S. Published Application No. 2006-0289652-A1. Deformation analysis of the symbol's spatial characteristics and strain measurement can be carried out as disclosed in U.S. Published Application No. 2006-0289652-A1, using the methods, algorithms, and apparatus as disclosed therein.

Figure 8:
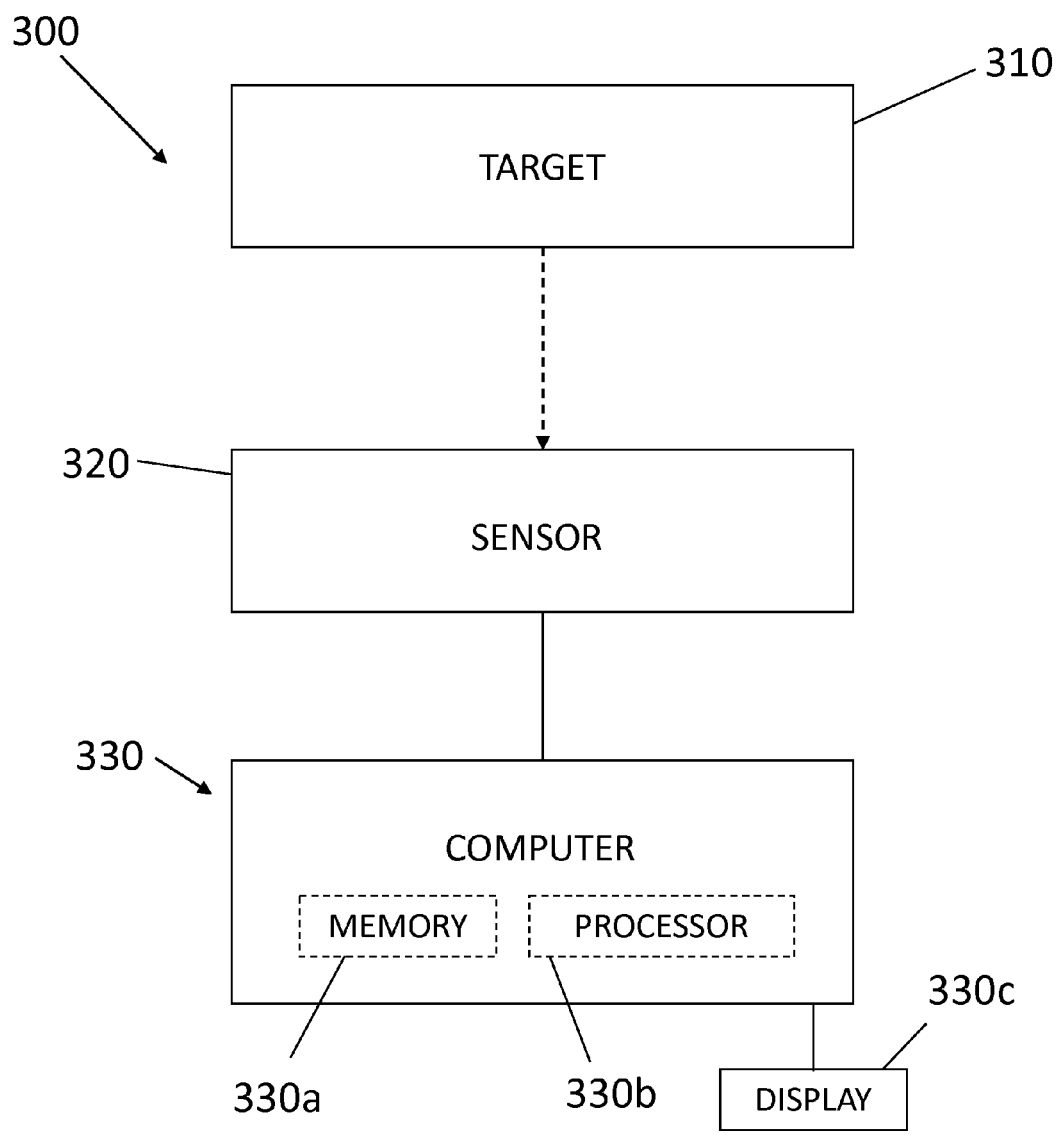
FIG. 8 is a diagrammatic view of a non-linear strain gage in accordance with the present invention.

Referring to FIG. 8, the non-linear strain gage 300 for measuring the strain on an object under load in accordance with the present invention, comprising a target 310, a sensor 320, and a computer 330, wherein the target 310 is a binary code symbol in accordance with the present invention, which has been manufactured or identified. The sensor 320, which is compatible with the detectable physical quantity emitted by the target, monitors the binary code symbol, pre-processes the detectable physical quantity emitted by the target, and outputs data representing the physical quantity. The computer 330 conventionally comprises memory 330a for storing programs and data and a processor 330b for implementing the programs and processing the data output by the sensor 320, and is associated with a display 330c for displaying data.

The non-linear strain gage 300 employing the nested symbols as a target uses the computer 330 to implement the same theory, algorithms, and computer programs as described in the U.S. Patent U.S. Published Application No. 2006-0289652-A1, which (1) identify the binary code symbols and the changes therein as a function of time and change in the load, (2) translate the changes in the binary code symbols into strain, and (3) display it in a suitable format. More particularly, the processor 330b means for analyzes the pre-processed data output by the sensor 320 to define the binary code symbol, and measures the strain on the object directly based on the pre-processed and analyzed data.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

We claim:
1. A non-linear strain gage comprising:
a target for association with an object for which at least one of strain and fatigue damage is to be measured, the target incorporating a nested binary code symbol for perimeter-based deformation and strain analysis, the target emitting a detectable physical quantity and comprising:
(a) a rectangular boundary binary code symbol including:
a solid, continuous outer perimeter;
first and second data regions along adjacent sides of the perimeter, each data region comprising at least one row of a plurality of data cells, each data cell representing a single bit of binary data;
first and second utility regions along adjacent sides of the perimeter opposite the first and second data regions, each utility region comprising at least one row of a plurality of utility cells of alternating appearance;
first and second finder cells at opposite corners of the rectangle; and
inner and outer quiet regions distinguishing the first and second data regions, the first and second utility regions, and the first and second finder cells from their background; and
(b) a core code symbol that provides encoded data;
sensor means for pre-processing the detectable physical quantity emitted by the target and outputting data representing the physical quantity, the sensor means being compatible with the detectable physical quantity;
analyzing means for analyzing the data output by the sensor means to define the binary code symbol; and
measuring means for measuring the strain on the object directly based on the pre-processed and analyzed data.
2. The non-linear strain gage of claim 1, wherein each data region of the binary code symbol comprises at least two rows and each utility region comprises at least two rows.
3. The non-linear strain gage of claim 1, wherein the binary code symbol further comprises at least one intermediate binary code symbol concentric with and nested between the boundary binary code symbol and the core code symbol, wherein the core code symbol is a binary code symbol of a different type than the at least one intermediate binary code symbol and the boundary binary code symbol.
4. The non-linear strain gage of claim 3, wherein the core code symbol of the binary code symbol is a binary code symbol of the same type as the at least one intermediate binary code symbol and the boundary binary code symbol.

5. A method of measuring strain on an object directly using the non-linear strain gage of claim 1, comprising the steps of:
- associating the target with an object in such a way that deformation of the target and deformation under load of the object bear a one-to-one relationship;
- using the sensor means to pre-process the detectable physical quantity emitted by the target and to output data representing the physical quantity;
- using the analyzing means to analyze the data output by the sensor means to define the binary code symbol and identify changes in the binary code symbol as a function of time and change in the load applied to the object; and
- translating the changes in the binary code symbol into a direct measurement of strain using the measuring means to measure the strain on the object directly based on the pre-processed and analyzed data.

6. A non-linear strain gage comprising:
- a target for association with an object for which at least one of strain and fatigue damage is to be measured, the target incorporating a nested binary code symbol for perimeter-based deformation and strain analysis, the binary code symbol emitting a detectable physical quantity and comprising:
  - a rectangular boundary binary code symbol;
  - a core code symbol that provides encoded data, wherein the core code symbol is nested within and concentric with the boundary binary code symbol; and
  - at least one intermediate binary code symbol concentric with and nested between the boundary binary code symbol and the core code symbol, wherein the at least one intermediate binary code symbol is a different type of binary code symbol than the boundary binary code symbol; and
- wherein:
  - (a) one of the boundary binary code symbol and the at least one intermediate binary code symbol comprises:
    - an outer perimeter constructed of line segments;
    - orienting means for determining the orientation of the binary code symbol, in order to associate strain measurements with physical dimensions, wherein the orienting means is bounded at least in part by the outer perimeter; and
    - inner and outer quiet regions for distinguishing the orienting means from its background; and
  - (b) the other of the boundary binary code symbol and the at least one intermediate binary code symbol comprises:
    - a solid, continuous outer perimeter;
    - first and second data regions along adjacent sides of the perimeter, each data region comprising at least one row of a plurality of data cells, each data cell representing a single bit of binary data;
    - first and second utility regions along adjacent sides of the perimeter opposite the first and second data regions, each utility region comprising at least one row of a plurality of utility cells of alternating appearance;
    - first and second finder cells at opposite corners of the rectangle; and
    - inner and outer quiet regions distinguishing the first and second data regions, the first and second utility regions, and the first and second finder cells from their background;
- sensor means for pre-processing the detectable physical quantity emitted by the target and outputting data representing the physical quantity, the sensor means being compatible with the detectable physical quantity;
- analyzing means for analyzing the data output by the sensor means to define the binary code symbol; and
- measuring means for measuring the strain on the object directly based on the pre-processed and analyzed data.

7. The non-linear strain gage of claim 6, wherein each data region comprises at least two rows and each utility region comprises at least two rows.

8. A method of measuring strain on an object directly using the non-linear strain gage of claim 6, comprising the steps of:
- associating the target with an object in such a way that deformation of the target and deformation under load of the object bear a one-to-one relationship;
- using the sensor means to pre-process the detectable physical quantity emitted by the target and to output data representing the physical quantity;
- using the analyzing means to analyze the data output by the sensor means to define the binary code symbol and identify changes in the binary code symbol as a function of time and change in the load applied to the object; and
- translating the changes in the binary code symbol into a direct measurement of strain using the measuring means to measure the strain on the object directly based on the pre-processed and analyzed data.

* * * * *